Nov. 2, 1971  F. A. MARINACCIO  3,616,802
FILTERING DEVICE
Filed Aug. 20, 1969

INVENTOR
F. A. MARINACCIO
BY
ATTORNEY

United States Patent Office 3,616,802
Patented Nov. 2, 1971

3,616,802
FILTERING DEVICE
Frank A. Marinaccio, Clark Road,
Bernardsville, N.J. 07924
Filed Aug. 20, 1969, Ser. No. 851,637
Int. Cl. A24d 1/04; A24f 7/04, 13/06
U.S. Cl. 131—261 B    7 Claims

ABSTRACT OF THE DISCLOSURE

A filter is disclosed which includes an accelerating member and a flap member. The accelerating member is perforated with a number of holes or orifices, while the flap member includes at least one hinged flap.

BACKGROUND OF THE INVENTION

Field of the invention

This invention pertains to filtering devices and relates specifically to those which are used to filter gaseous mediums. Broadly, the object of this invention is to remove particulate matter from such mediums.

Description of the prior art

Many kinds of filters are available for use in filtering gases. Each, moreover, uses one or another of several filtering principles. In one type, for example, a medium such as gas or smoke is passed through a mass or maze of fibrous material and the particulate matter contained therein is removed by sticking as it brushes against the filter fibers.

In another type, a particle-laden medium is passed through one or more orifices. The orifices accelerate the medium and then direct it against an impervious plate or wall. The accelerated medium, unable to pass through the plate or wall, changes the direction of its flow. Particulate matter accelerated with the medium, however, is unable to readily change direction and, as a result, splatters against the plate or wall and is thereby removed. This invention is directed specifically to filters of the latter or accelerated type.

One object of this invention is to improve filters wherein filtering is achieved by accelerating and diverting a medium which carries material to be filtered out.

Filters of the type decribed have particular application to cigarettes, cigars, and other tobacco products. In such smoke-producing products, it is generally desirable to filter out the tars, nicotine, and other combustion by-products before the tobacco smoke reaches the smoker's mouth. A smoker's enjoyment however, is impaired if the filtering action results in a hard drawing product.

Accordingly, it is another object of this invention to filter particulate matter from a gaseous medium such as tobacco smoke while imposing little burden on the flow thereof.

SUMMARY OF THE INVENTION

According to a preferred embodiment of this invention, an accelerating member and a flap member are combined in a filter in such a manner that the two members will be situated one behind the other when the filter is placed in the path of a gaseous medium to be filtered. Both members face each other in close proximity and the accelerating member includes a plurality of orifices for accelerating the medium, while the flap member is perforated with a plurality of intersecting slits which form one or more hinged flaps.

According to one feature of this invention, at least one flap in the flap member swings open in response to pressure exerted by the accelerating medium to allow the medium to pass through the flap member without encountering heavy flow resistance.

Other objects and features of this invention will become apparent from the following detailed specification when taken in conjunction with the drawing:

DETAILED DESCRIPTION

Figure 1:
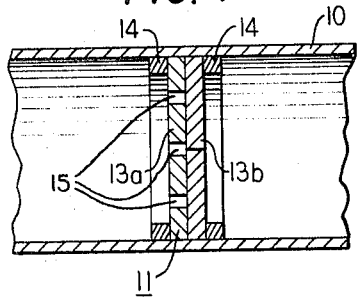
FIG. 1 is a partial section view of a tube which contains a filter element.
Figure 2:
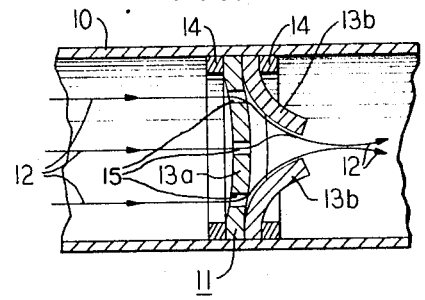
FIG. 2 is a partial section view of the tube and filter element shown in FIG. 1 as it appears when a gaseous medium is flowing therethrough as shown.

Referring now to FIG. 1, a tube 10 contains a filter element 11 as shown. The tube 10 carries gas, smoke, or similar medium which contains material of a particulate nature. For the purposes of illustration, the medium flowing in the tube 10 is represented in FIG. 2 by the arrows 12. For convenience, however, the arrows 12 will hereinafter be referred to as the medium 12.

The filter element 11 is positioned in the tube 10 so that the medium 12 flowing in the tube 10 will pass therethrough. The filter element 11 comprises an accelerating member 13a, a flap member 13b and two retaining rings 14. The accelerating member 13a intercepts and increases the velocity of the medium 12 as it flows through the tube 10, the flap member 13b tends to change the direction of the medium 12 after its velocity has been increased by the accelerating member 13a and the two retaining rings 14 hold the two members in place. As shown in FIGS. 1 and 2, the accelerating member 13a and the flap member 13b are placed one behind the other in the tube 10, with the accelerating member 13a upstream of the flap member 13b.

The accelerating member 13a is made of material which is substantially impervious to the particular medium sought to be filtered. For example, where the tube 10 is a cigarette and the medium 12 is tobacco smoke, the accelerating member 13a can be advantageously made from a wet strength paper such as that which is used for setting hair in the cosmetics industry. On the other hand, it can just as well be made of a material which is entirely impervious such as plastic.

Figure 3:
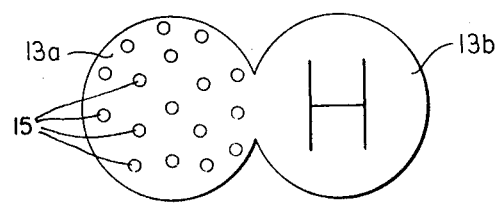
FIG. 3 is a front elevation view of part of the filter element comprising an accelerating member and a flap member.

No matter what the material from which it is made, however, the accelerating member 13a must include a plurality of orifices 15. As shown in FIG. 3, the orifices 15 are randomly spaced, although they can be symetrically arranged if desired. The orifices 15 can be made in any manner, but perforating the accelerating member 13a with a sharply pointed or spear-like tool is particularly convenient.

The flap member 13b is flexible, and as in the case of the accelerating member 13a, it is made of a material which is generally impervious to the particular medium to be filtered in the tube 10. Aagain, as in the case of the accelerating member 13a, where the tube 10 is a cigarette and the medium 12 is tobacco smoke, it may be conveniently made of a wet strength paper.

The components of the filter element 11 shown in FIG. 3 are not shown in the installed condition; rather, they are shown as they appear during manufacture. As illustrated, the accelerating member 13a and the flap member 13b have been cut from a single piece of filter material in a process which has left both joined together. In the next step, when they are being prepared for installation into the tube 10, the two elements will be folded until they are back to back as shown in FIGS. 1 and 2. While the two members are illustrated in FIG. 3 as a single unit, it will be recognized that they can also be made separately if desired.

Figure 4:
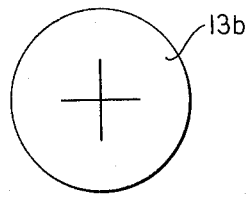
FIG. 4 is a front elevation of an alternative form of flap member.
Figure 5:
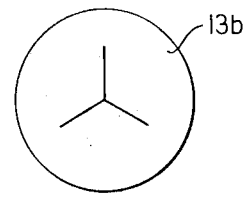
FIG. 5 is a front elevation view of another form of flap member.
Figure 6:
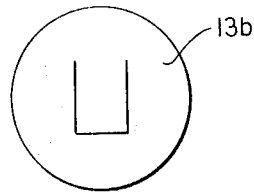
FIG. 6 is a front elevation view of another form of flap member.

As shown in FIGS. 3 through 6, the flap member 13b includes a plurality of slits which intersect each other. As shown in FIG. 3, for example, the slits are arranged to form an H configuration. With an H configuration, two opposing flaps are formed which are free at adjacent ends but hinged at distant ends. In FIGS. 4, 5, 6, the slits intersect to form a cross, an array in which the slits are symmetrically arranged about a mid-point, and a rectangular flap having two right angle corners, respectively.

While not shown, a compressing member may be installed between one retaining ring 14 and the accelerating member 13a. Such a compressing member could conveniently be made of a porous and compressible material such as polyurethane. When so installed, it will tend to press the accelerating member 13a and the flap member 13b together. Similarly, while two retaining rings 14 have been illustrated, the one adjacent to the flap member 13b can be eliminated if desired. In place thereof, the flap member 13b can be held in proper position by wedging it in place with conventional filter material. The retaining rings 14 can be made of any rigid material, but aluminum has proved to be quite satisfactory.

When the filter operates, the particulate-laden medium 12 is drawn through the tube 10 toward the filter element 11. When it reaches the filter element 11, it is blocked by the accelerating member 13a. As a result, a pressure buildup occurs which forces the medium 12 through the orifices 15. Thus, the orifices 15 act as venturi which utilize a pressure differential established between the two faces of the accelerating member 13a to accelerate the medium 12.

The accelerated medium 12, as it leaves the orifices 15, impinges on the face of the flap member 13b. Unable to penetrate the flap member 13b, the medium 12 changes its direction of flow until it ultimately converges on the hinged flaps formed by the intersecting slits.

As it impinges on the hinged flaps, the medium 12 exerts a pressure which causes the flaps to open. As the flaps open, the medium 12 readily escapes from between the accelerating member 13a and the flap member 13b. It is supposed, therefore, that back pressure, which the impinging medium 12 tends to build up, is thereby relieved. Thus, the opening of the flaps in the flap member 13b maintains the pressure differential which exists across the venturi in the accelerating member 13a. At the same time, moreover, the opening of the flaps permits free flow of the medium 12. Thus, only a limited burden is imposed on the free flow of the medium 12 as it passes through the accelerating member 13a and the flap member 13b.

Filtering begins, it is theorized, as the medium 12 changes direction. Specifically, it is thought that the particulate matter in the medium 12 is unable to negotiate the change of direction made by the medium 12 as it passes out of the orifices 15 and past the hinged flaps in the flap member 13b. It appears that the particulate matter separates from the medium 12 by splattering on the front of the flap member 13b, and then by clinging thereafter to initial deposits. In any event, when the filter element 11 has been tested in cigarettes, it has been observed that solid material accumulates on both the flap member 13b proper as well as the hinged flaps when the cigarettes are smoked.

More particularly, tests have been made using a flap member 13b having slits arranged in the configuration shown in FIG. 3. From the results of those tests, the filter disclosed herein removed approximately 20.6 milligrams of solid material, dry weight after desiccation, with acceptable draw, while conventional filters (i.e. those used on Winston brand cigarettes) removed about 8.6 milligrams of solid material, dry weight after desiccation.

In summary a filtering device has been disclosed which removes substantial amounts of particulate matter from a gaseous medium by accelerating and deflecting the medium while imposing only a limited burden on the free flow thereof. It is to be understood, however, that the embodiments disclosed herein are illustrative of the principles of the invention only. Many other structural modifications may be devised by those skilled in the art without departing from the spirit and scope of the invention.

What is claimed is:

1. A filtering device for removing particulate matter from a gaseous medium comprising a first member having perforations therein for accelerating a gaseous medium flowing into said filtering device and a second member normally in substantial face-to-face contact with said first member, made of a flexible material and adapted to divert the flow of said accelerated medium characterized in that said second member is perforated with a plurality of mutually connected and intersecting slits whereby at least one hinged flap is formed.

2. A filtering device in accordance with claim 1 wherein said slits are arranged in an H configuration.

3. A filtering device in accordance with claim 1 wherein said slits are arranged perpendicular to each other to form a cross.

4. A filtering device in accordance with claim 1 wherein said slits are symmetrically arrayed about a common mid-point.

5. A filtering device in accordance with claim 1 wherein said slits are arranged to form a flap having two right angle corners.

6. A filtering device for removing particulate matter from a gaseous medium comprising a first member having perforations therein for accelerating a gaseous medium flowing into said filtering device and a second member facing said first member, made of a flexible material and adapted to divert the flow of said accelerated medium characterized in that said second member is perforated by a single flap hinged to open in response to the impingement thereon of said accelerated gaseous medium.

7. A filtering device in accordance with claim 6 wherein said flap is formed by a plurality of mutually connected and intersecting slits cut in said second member.

References Cited

UNITED STATES PATENTS

| | | | |
|---|---|---|---|
| 2,709,441 | 5/1955 | Motsinger | 131—215 B X |
| 497,351 | 5/1893 | Shields | 131—215 B X |
| 634,806 | 10/1899 | Davey | 131—215 B X |
| 3,394,707 | 7/1968 | Ellis | 131—210 X |
| 3,397,704 | 8/1968 | Marinaccio | 131—10.3 X |

SAMUEL KOREN, Primary Examiner

J. F. PITRELLI, Assistant Examiner

U.S. Cl. X.R.

131—10.3, 210, 215 B; 55—417, 501, 522, 529